United States Patent [19]
Patterson et al.

[11] Patent Number: 5,231,159
[45] Date of Patent: Jul. 27, 1993

[54] HIGH TEMPERATURE RESISTANT MOLDED ELASTOMER

[75] Inventors: Philip M. Patterson, Littleton, Colo.; Richard L. Watkins, Katy, Tex.

[73] Assignee: The Gates Rubber Company, Denver, Colo.

[21] Appl. No.: 807,975

[22] Filed: Dec. 16, 1991

Related U.S. Application Data

[63] Continuation-in-part of Ser. No. 633,520, Dec. 27, 1990, abandoned.

[51] Int. Cl.$^5$ ............................................. C08G 18/10
[52] U.S. Cl. .................................... 528/53; 528/55; 528/57; 528/60; 528/61; 528/63; 528/64; 528/65; 528/66
[58] Field of Search ................ 528/53, 55, 57, 60, 528/61, 63, 64, 65, 66

[56] References Cited

U.S. PATENT DOCUMENTS 4,297,444 10/1981 Gilbert et al. ..................... 528/65

Primary Examiner—Maurice J. Welsh
Attorney, Agent, or Firm—J. L. Isaac; C. H. Castleman; H. W. Oberg

[57] ABSTRACT

A molded elastomer having high and low temperature resistance in dynamic applications. The elastomer includes the reaction product of an amine or hydroxy terminated polyol having an unsaturated level of less than about 0.06 milliequivalents per gram polyol, an hydroxyl or amine terminated chain extender, and a polyisocyanate-containing prepolymer capable of rapid reaction times with said chain extender when admixed together in a mold.

68 Claims, No Drawings

HIGH TEMPERATURE RESISTANT MOLDED ELASTOMER

RELATED APPLICATION

This application is a continuation-in-part of U.S. patent application Ser. No. 07/633,520, filed Dec. 27, 1990, now abandoned. This application further relates to U.S. patent application Ser. No. 07/633,510, now U.S. Pat. No. 5,112,282 filed concurrent with said U.S. application Ser. No. 07/633 520, and entitled, "High Temperature Polyurethane Belts", which application is assigned to the assignee of the present invention and the contents of which are specifically incorporated herein.

BACKGROUND OF THE INVENTION

1. Field of the Invention

This invention relates generally to polyurethane and/or urea elastomers and, more particularly, to reaction molded polyurethane elastomers and the like. Specifically, the present invention relates to a novel molded elastomer having both high and low temperature resistance in dynamic applications.

2. Description of the Prior Art

Polyurethane based elastomers are often prepared by reacting a relatively high equivalent weight active hydrogen-containing material, such as a polyol, and a relatively low equivalent weight active hydrogen-containing material, such as a chain extender, with a polyisocyanate. In preparing the elastomer, the reactive components and any catalysts or other optional additives are blended together and then transferred to a mold of suitable shape where the formulation is cured. Traditionally, this blending of the components and other additives has been performed in a batch process. It is typical practice to cure the elastomer in the mold, particularly in a batch process, until it is capable of maintaining the molded shape, and then demolding the elastomer and postcuring it until the polymerization is complete. In this manner, the molds may be used more often thereby permitting higher production rates.

Since it is usually desirable to produce as many molded parts as possible in a given period of time, it is important that the residence time in the mold be as short as possible. Accordingly, it is desirable that the elastomer formulation cure relatively rapidly in the mold to a state at which the elastomer can be demolded and post-cured. In batch processing, however, it is necessary that the formulation not cure too quickly since some time is required to blend the batch components of the formulation and then transfer the blend to the mold.

In practice, particularly with conventional casting techniques and batch processing using deactivated amine chain extenders, no catalyst is used. In such instances, typical in-mold residence times range from about 1-5 hours, depending on the particular components used and the cure temperature. In addition, certain hand/machine cast techniques which are heavily catalyzed form in well under one hour mold time. Such cast techniques have been particularly useful in forming roller skate wheels and the like. However, in order to decrease energy usage and increase productivity, it is desirable to provide an elastomer formulation which cures much more quickly and at a lower mold temperature. A common target for preparing elastomers has been a thirty minute residence time at about 100°-130° C. utilizing a catalyst system. However, it has at times been difficult to obtain optimal properties and morphology from elastomers prepared utilizing catalyst and batch processing systems.

Reaction Injection Molding (RIM) is a technique for the rapid mixing and molding of large, fast curing urethane parts. RIM polyurethane parts have traditionally been used in a variety of exterior body applications on automobiles where their light weight contributes to energy conservation. RIM parts are generally made by rapidly mixing active hydrogen containing materials with polyisocyanate and simultaneously injecting the mixture into a mold where reaction proceeds. These active hydrogen containing materials typically include a high molecular weight polyhydric polyether and/or a low molecular weight active hydrogen containing compound, i.e., a chain extender. Moreover, RIM parts for automotive application typically are reacted very quickly and demolded in 1-2 minutes. After reaction and demolding, the parts may be subjected to an additional curing step by placing the parts at an ambient temperature of about 250° F. or greater for 4-24 hours. Unfortunately, the extremely rapid reaction time causes a loss of control over the morphological structure.

Typical of accepted RIM practice is to place all components except the isocyanate in one vessel (called the B component) and the isocyanate in another vessel (called the A component) prior to reaction and then mixing the A and B components together in a selected stoichiometric balance in a mold. U.S. Pat. No. 4,297,444 discloses a modification to this traditional procedure. This modification includes the prereacting of a portion of the high molecular weight polyhydric polyether with a portion of the isocyanate. The chain extender and the remaining polyhydric polyether, if any, is then mixed together along with the prepolymer in a RIM process to react the components to form a RIM polyurethane elastomer.

Numerous other patents disclose RIM elastomers and their preparation including U.S. Pat. Nos. 4,806,615, 4,742,090, 4,404,353, 4,732,919, 4,530,941 and 4,607,090.

As indicated above, RIM elastomers have been readily utilized as automobile fascia and other components thereof, such as fenders, steering wheels, dashboards, and various other structural and flexible components. The significant advantage in the RIM processing technique is that mixing, reaction and molding injection all take place simultaneously so as to reduce the amount of residence time in the mold. Thus, RIM elastomers have found wide acceptance in a variety of consumer and industrial applications.

However, the majority of these product applications involve static and/or nonloaded applications, wherein the component part is not subjected to external loading. Another area of concern relates to temperature resistance wherein certain products are subjected to temperature extremes, both elevated and lowered temperatures. In certain applications, such as automobile timing and power transmission belts, V-belts, micro-ribbed belts, molded boots for U-joints, and the like, the product is subjected to both high and low temperatures in dynamic loading conditions. In such situations, elastomers have to date been unacceptable for long term usage due to their tendency to yield and/or crack under dynamic loading at both high and low temperatures. Thus, there remains a need for polyurethane elastomers that have the characteristics necessary to withstand dynamic loading under high and low temperature conditions.

SUMMARY OF THE INVENTION

Accordingly, it is one object of the present invention to provide an improved molded elastomer.

It is another object of the present invention to provide a polyurethane product having high and low temperature resistance properties in dynamic applications.

Yet another object of the present invention is to provide a high temperature resistant dynamic elastomer capable of formation using reaction injection molding techniques.

To achieve the foregoing and other objects and in accordance with a purpose of the present invention, as embodied and broadly described herein, a molded elastomer is disclosed. The molded elastomer has high and low temperature resistance in dynamic applications and includes the reaction product of an amine or hydroxy terminated polyol, having an unsaturated level of less than bout 0.06 milliequivalents per gram polyol an hydroxyl or amine terminated chain extender, and a polyisocyanate-containing prepolymer capable of rapid reaction times with the extender when injected together into a mold.

DESCRIPTION OF THE PREFERRED EMBODIMENTS

The thermal and dimensional stability of polyurethane elastomeric parts or components under static or non-load conditions has previously been addressed. For example, U.S. Pat. No. 4,297,444 addresses these properties in a reaction injection molding (RIM) system. Specifically, there are two important aspects to high temperature dimensional stability of polyurethane parts. The first aspect is droop or sag of the molded article when subjected to high temperature, and the second is permanent shrinkage or expansion of the article's dimensions as a result of exposure to elevated or lowered temperatures. However, when these components are put under a dynamic load condition and then subjected to elevated temperatures such as 285° F. or more, the ability of the prior art components to withstand such elevated temperatures and retain their shape is substantially changed. This is especially true in belt applications. Moreover, the predictability of such components to elevated or lowered temperature extremes under dynamic load becomes uncertain. The present invention, however, avoids such droop or sag and maintains modulus under dynamic loading conditions when elevated to temperatures of up to 285° F. and more. In addition, the components of the present invention are also able to perform well under low temperature situations such as about −75° F.

The polyols useful in the present invention include polyether polyols, polyester polyols and the like. More preferably, the polyol includes a polyether polyol having an average hydroxyl functionality of from about 2 to 8 with an average hydroxyl equivalent weight of from about 500–5000. A more preferred embodiment includes a polyether polyol hydroxyl functionality of from about 2 to 4 with an hydroxyl equivalent weight of approximately 1000–3000. In an even more preferred embodiment, the polyether polyol includes an average hydroxyl functionality of from about 2–3 with an average hydroxyl equivalent weight of approximately 1500–2500.

The desired polyol is preferably one that has a narrow molecular weight distribution and has a very low polydispersity of about 1.05 or less. In a more preferred embodiment, the polydispersity is about 1.035 or less. A critical factor in the preferred embodiment of the invention involves the use of a polyol with a very low unsaturation level, that is the number of molecules with a single reactive site. The greater the unsaturation level, the greater the monofunctional species in the polyol. Thus, the lower the unsaturation level, the higher the functionality or number of reactive sites per molecule in the polyol. It was discovered that power transmission belts constructed from early developed RIM elastomers were cracking unexpectedly at elevated temperatures, and that a decrease in the unsaturation level alleviated this problem. Tests of belts having unsaturation levels of 0.03–0.04 milliequivalent per gram sample (meq/g) provided belts which ran for 1157 and 1259 hours at 275° F. and for 2335 hours at room temperature. However, belts with unsaturation levels of greater than 0.07 meq/g ran for periods of only 478 hours at 275° F. and 921 hours at room temperature. The preferred polyol unsaturation level is at least as low as 0.06 milliequivalents per gram sample and preferably less than 0.03.

A preferred polyol includes alkylene oxides and more preferably an alkylene oxide which includes either propylene oxide (PPO), ethylene oxide or polytetramethylene oxide (PTMO). The preferred alkylene oxide is a polypropylene oxide. The more highly preferred polyol is polypropylene oxide polyol having a molecular weight of approximately 5500–6000.

The polyisocyanate-containing prepolymer may be composed entirely of a polyisocyanate or may be a mixture of polyisocyanate with a portion or all of the polyol. Use of a true polyisocyanate prepolymer (i.e., about 15 weight percent NCO or less) in the present invention, however, has been found to be very important. Prior art RIM elastomers for nondynamic applications have generally used basic isocyanate elastomers (about 32 weight percent NCO or more) or quasi-prepolymers (about 16–25 weight percent NCO). However, the functionality of such elastomers under dynamic load was unsatisfactory as discussed above.

A wide variety of polyisocyanates may be utilized with the prepolymer of the present invention. Suitable aliphatic polyisocyanates include trans, trans-1, 4-cyclohexyl diisocyanate, 1,6-hexane diisocyanate and mixtures thereof. However, the preferred polyisocyanate is aromatic having two or more —NCO groups per molecule. Typical aromatic polyisocyanates useful in this invention include 2,4-toluene diisocyanate (TDI), 2,6-toluene diisocyanate, 1,4-phenylene diisocyanate, 4,4'-diphenyl methane diisocyanate (MDI), p-phenylene diisocyanate (PPDI), trimethyl xylylene diisocyanate (TMXDI), and mixtures thereof. Whatever the aromatic polyisocyanate selected for use in the present invention, it is imperative that it be capable of rapid reaction time when admixed with a selected chain extender. Thus, some extenders as described below may be slow thereby requiring a faster reacting polyisocyanate. On the other hand, some extenders may be relatively fast thereby preferring the use of a slower reacting polyisocyanate such as PPDI. In this manner, the combinations may be used in a RIM process wherein reaction time is approximately five seconds versus pot reaction of about five minutes in batch casting processing.

In a preferred form, the polyisocyanate is MDI. The preferred prepolymer is the reaction product of the polyisocyanate and the polyol such that there is at least a slight excess of the polyisocyanate without extensive coupling of the polyol.

Regardless of the selected polyisocyanate, the prepolymer preferably includes an isocyanate composition of approximately 3-25 weight percent —NCO. In a preferred embodiment, the isocyanate includes about 6-15 weight percent NCO with the more preferred —NCO content being about 7-12 weight percent. In addition, a preferred stoichiometric mixing ratio of polyisocyanate to polyol, expressed as a reactive ratio of NCO/—OH, is approximately 0.90-1.20 and more preferably approximately about 1.01-1.03.

The chain extenders useful in the present invention are selected so as to be capable of rapid reaction time with the prepolymer. The chain extender may include a compound of aliphatic hydroxy compounds, aliphatic amines, aromatic amines and mixtures thereof. In one form, the chain extender may include an aliphatic hydroxide compound of low molecular weight oligomers such as propylene oxide, ethylene oxide and 1,2-butylene oxide. In another embodiment of the invention, the chain extender may include an aliphatic amine such as ethylene diamine, 1,3-diaminopropane, 1,4-diaminobutane, hexamethylenediamine, aminoethanolamine, 1,4-diaminocyclohexane, and triethylenetetramine.

In a preferred embodiment of the invention, the chain extender is an aromatic amine which may include 2,4-diaminotoluene, 2,6-diaminotolune, 1,5-napthalenediamine, 1,4-phenylenediamine, 1,4-diaminobenzene, 4,4'-methylene bis(orthochloroaniline), 1,4-butylene glycol, 4,4'-methylenebisdianiline (MDA), 3,5-diethyl-2,4-diaminotoluene, diethyl toluene diamine, and 3,3',5,5'tetraisopropyl-4,4'-methylenebisaniline. In this more preferred form, the aromatic amine chain extender is 4,4'-methylenebis(orthochloroaniline), better known as MOCA or MBOCA.

In a more preferred form of the invention, the chain extender comprises the aromatic amine MOCA present in the amount of approximately 20-100 weight percent relative to the combined amount of chain extender and polyol. More preferably, this composition is selected so that MOCA is present in approximately 35-40 percent by weight relative to the combined amount of the chain extender and polyol. In an alternate preferred embodiment wherein the elastomer is a RIM reaction product, only the isocyanate-containing prepolymer forms the A-side component of the RIM process so that the B-side component consists of 100% chain extender, preferably MOCA, relative to any polyol. In this manner, one can better control the rate of hard segment formation and subsequent phase separation in the elastomer, because the isocyanate in this instance is not involved in two competing reactions during the mold RIM injection.

A more preferred form of the present invention is an elastomeric product wherein the polyol is 5500-6000 molecular weight polypropylene oxide, ethylene oxide capped, the chain extender is MOCA present in approximately 35-40 weight percent relative to the combination of MOCA and polyol, and the prepolymer comprises the above polyol with MDI resulting in 8-9% NCO.

Other added compounds may be useful with the composition of the present invention. These include catalysts to decrease the reaction time of the components. The catalysts may be selected from any desirable compound known in the art and is preferably selected from organo-metal compounds, tertiary amines, and alkali metal alkoxides. However, the polyurea-urethanes can be prepared with or without catalysts. Those polyols which do not contain amine terminated groups are most typically prepared with a catalyst as described above. Suitable organo-metal compounds useful as catalysts include but are not necessarily limited to aliphatic soaps of tin, mercury, iron, zinc, bismuth, antimony, cobalt, maganese, vanadium, copper and the like. Examples include organic ligands which are carboxylic acids of 2-20 carbons, such as dibutyl tin dilaurate, dimethyl tin dilaurate, phenylmercuric propionate, copper napthenate and the like. A particularly preferred catalyst with the composition of the present invention is bismuth neodecanoate.

The present invention may also utilize various other additives in order to assist in the processing of a product from the composition of the invention or to assist in the functioning of a product made from the elastomer of the invention. For example, antioxidants are particularly useful when the elastomeric composition of the present invention is utilized in a power transmission belt product. Suitable antioxidants include 2,6-di-t-butylphenol and polyalkylene glycol esters of hindered phenols of substituted alkanoic acids. Examples include 3,5-di-t-butyl-4-hydroxybenzoic acid ester of ethylene glycol, bis{3-(3-methyl-5-t-butyl-4-hydroxyphenyl) propionate} of trimethylene glycol. The last example is a preferred product commercially available from Ciba-Geigy under the trade name Irganox 245.

Another additive to the elastomer composition which is particularly useful when the composition is used in a power transmission belt product is a slip agent preferably in the form of a silicon lubricant, and in particular a polysiloxane In the most preferred form, the polysiloxane has a 2000 molecular weight with 20 centistoke viscosity, although a preferred molecular weight range is in the neighborhood of about 1,000-3,000 depending on the weight percent loading and viscosity as described below. The polysiloxane is useful in the belt product made from the present invention to reduce noise as the belt moves through sheaves The advantage of the polysiloxane was found that it does not affect the urethane molecular structure of the elastomer in that it appears to preferentially occupy the void free volume in the soft segment of the urethane rather than interfering with the hard segment. Consequently, it does appear to have the unique ability to readily move through the elastomeric composition to the elastomer surface, and the degree of freedom of movement is dependent directly on the molecular weight and viscosity of the polysiloxane material.

At the surface of the belt product made from the present invention, the polysiloxane assists in decreasing the noise caused by movement of the belt product through the sheave. If the molecular weight of the polysiloxane is too low, the molecules of the polysiloxane tend to diffuse out of the elastomer product too quickly. This prematurely eliminates the anti-noise capability of the elastomeric belt product during its lifetime. On the other hand, if the molecular weight range is too high, the polysiloxane molecules are too large to readily migrate through the elastomer to its surface. Once the initial polysiloxane layer at the surface is depleted, then, the noise abatement capability of the polysiloxane throughout the remainder of the belt product is reduced because of slow diffusion to the elastomer surface.

To determine the operating parameters of the slip agent in the present invention, a series of tests were performed. In the first test, a set of belts was made with commercially available polydimethylsiloxane (PDMS) additive at a one percent by weight level. The PDMS additive represented a wide range of molecular weights in this first test. Polyurethane belts were made identically utilizing the elastomer of the invention except for the different molecular weight levels of the PDMS, and the different belts were then tested on both a 1987 Celebrity Serpentine drive and a Mercedes 190D engine for noise levels. Results of this first test are illustrated in Table I below.

TABLE I

| PDMS Molecular Weight | Noise Evaluation |
| --- | --- |
| 2,000 | *Quiet |
| 13,050 | Noisy after 2-3 hours |
| 139,000 | Noisy after 2-3 hours |

*4092 hours on Celebrity and 750 hours on Mercedes - max. test runs

As can be seen from the data of Table I, the importance of selecting a polysiloxane additive with appropriate molecular weight is illustrated. The lower molecular weight provided an elastomer belt product which was quiet throughout the length of the test, both 750 hours on the Mercedes engine as well as over 4,000 hours on the Chevy engine. However, when the molecular weight was substantially increased, the belts became noisy in a relatively short period of time. It is believed that the higher molecular weight polysiloxanes defuse through the soft segment so slowly that they cannot effectively function as a lubricant for the elastomeric product so that the belt becomes noisy after a short period of time, once the lubricant on the surface of the belt is used up. However, the 2,000 molecular weight PDMS at the one percent by weight level apparently had a proper molecular weight such that the siloxane could defuse to the elastomer surface at the correct rate to continuously act as a lubricant at the surface to reduce noise of the belt product.

As can be seen from Table I, molecular weights as low as 13050 did not prevent belt noise for more than a few hours. To further define a narrow range of preferred PDMS molecular weights which would work as well as a 2,000 molecular weight PDMS, commercially available siloxanes were selected ranging from 1200 molecular weight to 13650 molecular weight and incorporated into elastomers of the invention which were then used to make belts as with the tests for Table I. The results of this set of slip agent experiments is indicated in Table II below.

TABLE II

| Belt Number | PDMS Molecular Weight | PDMS Viscosity (centistokes) | Onset of Noise (hrs) |
| --- | --- | --- | --- |
| Belt 1 | 1250 | 10 | <144 |
| Belt 2 | 2000 | 20 | >750 |
| Belt 3 | 3780 | 50 | <24 |
| Belt 10 | 1650 (branched) | 50 | <24 |
| Belt 4 | 5970 | 100 | <24 |
| Belt 5 | 9430 | 200 | <24 |
| Belt 6 | 13650 | 350 | <24 |

Included in Table II is the corresponding viscosity of the various molecular weight PDMS liquids. Belt 10 was made from an elastomer which incorporated a branched siloxane for a comparison with unbranched species having the same viscosity, that of 50 cenistokes. The test results indicated in the last column of Table II were based on polyurethane belts tested for noise on the Mercedes engine when they are run continuously at an idling speed of approximately 750 rpm.

As previously stated, a control belt with no siloxane becomes extremely noisy within about three hours on the Mercedes engine. Belts with the 1% by weight level of the 2000 molecular weight PDMS (Belt 2) have been run up to 750 hours with no belt noise. As indicated from Table II, all the belts with PDMS molecular weight higher than the 2000 molecular weight at 1% by weight loading became noisy within 24 hours. The one belt that was formulated with the elastomer having the lower molecular weight PDMS at a 1% weight level (Belt 1) was quiet for about 144 hours and then started chirping. This lower molecular weight additive is believed to defuse through the soft segment too rapidly and depleted quickly at the 1% by weight loading in this time frame. Belt 10, made with the branched PDMS, shows that the slip agent additive functions primarily according to its viscosity, rather than its molecular weight. The example above with a 50 centistoke viscosity and 1650 molecular weight (Belt 10) reduced noise for less than 24 hours as did the straight chain 50 centistoke PDMS (Belt 3). A straight chain 1650 molecular weight should reduce noise quite effectively since it would fall between the 1250 and 2000 molecular weight materials, both of which reduced noise much longer than 24 hours. Thus, it is believed that viscosity is the principal functioning parameter.

Table III below shows noise results with several PDMS additives in equivalent molecular loading, that is the PDMS additives were loaded to give the same molar equivalent as the 2000 molecular weight additive at the 1% by weight loading.

TABLE III

| Belt Number | PDMS Molecular Weight | PDMS Viscosity (centistokes) | Onset of Noise (hrs) |
| --- | --- | --- | --- |
| Belt 2 | 2000 | 20 | >750 |
| Belt 7 | 3780 | 50 | <48 |
| Belt 8 | 5970 | 100 | <56 |
| Belt 9 | 13650 | 350 | <36 |

As can be seen from Table III, the belts made from an elastomer with PDMS molecular weights higher than 2000 are quieter longer than the corresponding belts at a 1% by weight loading as shown in Table II. This is believed to be due to progressively more siloxane in the formulation as molecular weight increases for an equivalent molar loading. Again, however, as in the 1% by weight loading illustrated in Table II, these higher molecular weight PDMS materials do not readily apparently migrate through the soft segment to replenish the elastomer surface for noise reduction, and thus do not show noise reduction at significant hour levels as does Belt 2.

Additional tests were made with the 2000 molecular weight PDMS additive due to the significant noise reduction levels achieved. These tests related to the tensile and tear properties of hand cast plaques made from elastomer of the present invention with and without the 2000 molecular weight PDMS additive at a one percent weight loading. When standard deviations were considered in these tests, this slip agent additive did not appear to have any detrimental effect on tensile and tear properties of the polyurethane material. Moreover, Taber abrasion tests were performed on the polyurethane materials, and the results indicated that the addition of the PDMS 2000 molecular weight additives of 1% by weight significantly improved the abrasion resistance of the polyurethane material Finally, tests were performed on the polyurethane material with the 2000 molecular weight PDMS additive at 1% by weight using a Rheometrics Dynamic Spectrometer, and it was determined that the addition of PDMS additive had virtually no effect on the viscoelastic properties of the polyurethane material.

In preparing the elastomer composition of the present invention, any known molding process may be utilized including casting, injection molding and reaction injection molding. In the preferred form, RIM is utilized, and the elastomer composition of the invention is the RIM reaction product as now discussed in detail below. In this preferred RIM embodiment, two fluid input streams are formed. The A-side component stream includes the polyisocyanate-containing prepolymer, while the B-side component includes the chain extender, excess polyol, if any, and other miscellaneous additives such as catalyst, colors and the like. The A-side prepolymer may include just the polyisocyanate selected as described above, or it may include a combination of a prereacted polyisocyanate and a percentage of the polyol up to and including 100% of the polyol utilized in the elastomeric composition with or without an excess of —NCO. The B-side component, as described above, includes the remaining excess polyol unless 100% of the polyol is admixed in the A-side prepolymer. As indicated, the A-side isocyanate-containing prepolymer is prereacted at appropriate temperatures to form the A-side fluid stream component.

Once the A-side and B-side constituent streams are formed as described above, they are injected through a RIM mixhead into a mold. The mixhead is designed to mix the A and B side components together and subsequently inject them into the mold thereby reacting the A and B side components during injection typical of RIM processes. The A and B mixed composition is injected into the mold of such a configuration to yield the shape desired. The injected and reacted composition is then allowed to gel and solidify in the mold, at which time it is demolded and permitted to postcure separate from the mold.

The processing temperatures of both the A and B side will generally range from 40°-120° C. and preferably 65°-75° C. The gel time of the material in the mold will vary depending on the constituent components thereof. The gel time will generally be between 0-15 minutes. More particularly, when a catalyst is not utilized, a hard gel will generally take place in 1½-2 minutes or, if activated amines are used, in about 15 seconds. When a catalyst is utilized, a soft gel is initially obtained followed by vitrification in approximately 20 seconds. The demold time will generally range from 1-60 minutes with a postcure time of from 0-24 hours at about 200°-450° F. These ranges, of course, will depend upon the actual selection of the polyisocyanate, chain extender and polyol combinations. It should be noted that the A and B side component reactants are injected typically at approximately 100-800 grams per second into the mold.

The resultant elastomeric composition of the present invention is a combination of hard and soft segments created by the reacted constituents as described above. Important aspects of the present invention are that the hard segment average length is fairly uniform and that the hard segments are closely associated with each other. Therefore, the elastomeric composition of the present invention has better flex fatigue characteristics and tends to be more resistant to cracking than prior art materials. Moreover, the ethylene oxide groups on the ends of the polyol assist in phase segregation of the hard and soft segments. As a result, the elastomeric composition of the present invention tends to actually become somewhat softer over heat age during use rather than getting brittle as in prior art compositions, which tend to thermoset or crystallize depending on the nature of the composition.

The significant advantage of the present invention is in combined high and low temperature applications and thus provides the elastomeric composition of the present invention with high and low temperature resistance. The present invention is particularly useful in dynamic applications when loads are applied in high temperature environments, which applications would tend to cause either cracking or thermosetting of prior art compositions. Examples of products subjected to such conditions and for which the present invention is highly useful include power transmission belts such as synchronous belts, V-belts, micro-ribbed belts, molded boots and other molded products, and the like.

The present invention also has good low temperature resistance as well. This is due to the low glass transition temperature of the propylene oxide polyols as well as improved phase segregation.

The following examples are provided to illustrate the present invention, but are not intended to limit the scope thereof. All parts and percentages listed in the examples below are by weight unless otherwise indicated, and the NCO content is generally ±0.5 weight percent.

EXAMPLE I

An elastomeric composition of the present invention was prepared by admixing 6000 molecular weight (MW) polypropylene oxide glycol (PPO) with MDI to prepare a prepolymer having approximately 8.0 weight percent NCO. 157.7 grams of this prepolymer was then charged into the A-component tank. The B-component working tank was then charged with 92.3 grams of a mixture of the balance, i.e., 54.5 grams, of the polypropylene oxide glycol, and 36.3 grams of MOCA. This provided a 60:40 ratio of polyol to chain extender in the B-side component. In addition, additives to the B-side included approximately 0.2 grams of a bismuth neodecanoate catalyst available under the trade name Coscat 83 manufactured by Caschem Company, and 1.2 grams of an antioxidant commercially available from Ciba-Geigy under the trade name Irganox 245, which is bis-{3-methyl-5-t-butyl-4-hydroxyphenyl) propionate} of trimethylene glycol. The A and B side components were then injected through a RIM mixhead into a production-type power transmission belt mold. The resultant molded product had an A to B ratio of approximately 1.7 with a hard segment weight percent of approximately 32.3. The molded product was demolded, postcured and cut into endless synchronous belts which were tested at temperatures of up to about 270° F. under load. The belts exhibited excellent high temperature resistance. Moreover, the belts exhibited excellent strength and resistance at low temperatures of about −75° F.

EXAMPLE II

A series of elastomeric compositions of the present invention were prepared using A and B components similar to those of Example I. The A-sides were each identical to the A-side of Example I. The only difference between each series of this Example II and that of Example I was in the relative amounts of PPO and MOCA charged into the B-side tank. These amounts were varied so as to provide the following polyol to chain extender ratios in the B-side components:

| | | |
|---|---|---|
| IIa. | 70:30 | |
| IIb. | 80:20 | |
| IIc. | 90:10 | |

Each of these B-side components were injected, respectively, along with the identified A-side component through a RIM mixhead into a production-type power transmission belt mold to ultimately form synchronous belts from each composition. These belts were then tested under dynamic loading at 270° F., room temperature and sub-zero temperature. Comparing the results of the tests of these Examples IIa, IIb, and IIc and I, I was determined that as the B-side ratio increased from 60:40 (Ex. I) to 90:10 (Ex. IIc), the modulus of the belt compositions decreased. Moreover, as the ratio increased, both the high temperature resistance properties as well as the ultimate tensile strength decreased. Therefore, while all the composition variations produced highly acceptable belts, the best performance was obtained from the composition of Example I.

EXAMPLE III

Another elastomeric composition of the present invention is prepared utilizing the 6000 molecular weight PPO with MDI to prepare a prepolymer having 12 weight percent NCO instead of 8 percent. In this instance, 133.3 grams of this prepolymer was charged into the A-component tank. The B-component tank was charged with 116.7 grams of a mixture containing 69.1 grams of the remaining PPO glycol and 46.1 grams of MOCA to provide a 60:40 ratio of polyol to chain extender in the B-side component, similar to Example I. In addition, the additives to the B-side component also included approximately 0.2 grams of the Coscat 83 catalyst and 1.2 grams of the Irganox 245 antioxidant. The A and B side components were then injected through a RIM mixhead into a production-type power transmission belt mold. The resultant product had an A to B ratio of approximately 1.1 with a hard segment weight percent of approximately 39.8. As a result of increasing the NCO content, the composition of the invention produced a slightly harder belt, and the temperature resistance at the high end increased slightly.

EXAMPLE IV

Another elastomeric composition of the present invention is prepared by admixing 5000 molecular weight PPO with MDI to prepare a prepolymer having 12 weight percent NCO. 99.6 grams of this prepolymer is then charged into the A-component tank. The B-component working tank is charged with 150.4 grams of a mixture of the balance, i.e., 119.1 grams, of the PPO and 29.8 grams of MOCA to provide a 80:20 ratio of polyol to chain extender in the B-side component. In addition, additives to the B-side include approximately 0.2 grams of the Coscat 83 bismuth neodecanoate catalyst and 1.2 grams of the Irganox 245 antioxidant. The A and B side components are then injected through a RIM mixhead into a production-type power transmission belt mold, and the resultant product has an A to B ratio of approximately 0.7. This increase in ratio with a lower molecular weight PPO tends to reduce high temperature resistance and tensile strength.

EXAMPLE V

Still another variation of the elastomeric composition of the present invention somewhat similar to that of Example I is prepared by admixing 5000 molecular weight PPO with sufficient MDI to prepare a prepolymer having 6 weight percent NCO. In this instance, 173.5 grams of this prepolymer is charged into the A component tank. The B component tank is then charged with 76.5 grams of a mixture including 45.0 grams of the remaining PPO glycol and 30.0 grams of MOCA to provide a 60:40 ratio of polyol to chain extender on the B-side component. In addition, additives to the B-side component are similar to those of the prior examples and include 0.2 grams of the Coscat 83 catalyst and 1.2 grams of the Irganox 245 antioxidant. Again, the A and B side components are injected through a RIM mixhead into a mold, and the resultant belt product has an A:B ratio of approximately 2.3. Unfortunately, the 6 weight percent NCO level does not produce a very high weight percent hard segment. Consequently, belts constructed from the composition of this Example V have a reduced high temperature resistance and tensile strength.

EXAMPLE VI

In this particular example, yet another variation of Examples I and II is produced. The elastomeric composition of this example is formulated by admixing 5000 molecular weight PPO with sufficient MDI to prepare a prepolymer having a high 23.5 weight percent NCO. In this instance, 80.6 grams of the prepolymer are then charged into the A component tank. The B component tank is charged with 169.4 grams of a mixture including 151.1 grams of the remaining PPO polyol and 16.8 grams of 1,4-butylene glycol (BDO) to provide a 90:10 ratio of polyol to chain extender in the B-side component. In addition, the additives to the B-side component remain the same as in the previous examples, that is approximately 0.2 grams of the Coscat 83 catalyst and 1.2 grams of the Irganox 245 antioxidant. As before, the A and B components are rapidly injected through a RIM mixhead into a belt mold, and the resultant belt product has an A to B ratio of approximately 0.5. This composition produces a belt inconsistent in performance because of the random elastomer which results.

EXAMPLE VII

In this particular example, all the polyol was included in the A-side component. More specifically, the elastomeric composition of the present invention was prepared in this Example by admixing 6000 molecular weight PPO with sufficient MDI to prepare a prepolymer having 3.0 weight percent NCO. As indicated, all of the PPO polyol of the resultant elastomer was included in this prepolymer of the A-side component. In this instance, 227.3 grams of this prepolymer was charged into the A component tank. The B component tank was then charged with 22.7 grams of a mixture consisting virtually entirely of MOCA, that is 21.7 grams, admixed with the remaining additives to the B-side including 0.3 grams of the Coscat 83 catalyst and 0.7 grams of the Irganox 245 antioxidant. The A and B side components then were rapidly injected through a RIM mixhead and into a mold, and the resultant product had an A to B ratio of 10.0. The elastomeric product was tested, and it tended to be slightly low in modulus apparently due to the low NCO content. This affected its high temperature resistance capability as a synchronous belt. However, it had good resiliency and would be very desirable for use in an adhesive elastomer application.

EXAMPLE VIII

In this example, an elastomeric composition of the present invention is prepared by admixing the polyol polytetramethylene oxide (PTMO) with sufficient amount of the polyisocyanate TDI to prepare a prepolymer having 5.3 weight percent NCO. In this particular example, all the polyol of the composition is placed in the A-side component. 212.9 grams of this prepolymer is charged into the A component tank. The B component working tank is then charged with 37.1 grams of a mixture of 35.9 grams of MOCA with 1.2 grams of the Irganox 245 antioxidant. No catalyst is utilized. The A and B side components are injected through a RIM mixhead into a production type power transmission belt mold. The resultant belt product has an A to B ratio of approximately 5.7 and produces a good belt having acceptable high and low temperature resistance properties.

EXAMPLE IX

In this particular example, all the polyol is again placed in the A-side component. In this instance, the elastomeric composition of the invention is prepared by admixing the polyol PTMO with sufficient amount of p-phenylene diisocyanate (PPDI), to produce a prepolymer having 6.5 weight percent NCO. Once the prepolymer is formed, 218.6 grams of the prepolymer are charged into the A-component tank. The B-component tank is charged with 30.1 grams of the chain extender diethyl tolulene diamine (DETDA) with 1.2 grams of the Irganox 245 antioxidant additive. The A and B side components are then injected through a RIM mixhead into a mold, and the resultant product has an A to B ratio of 7.0. A belt produced from this composition has a high modulus, high tensile strength and good elongation. Moreover, it has good high temperature (285° F.) resistance properties.

EXAMPLE X

In this particular example, and in the Examples XI–XIII, which follow, the A-side component is prepared in identical fashion. In all of these examples X–XIII, all of the polyol is placed in the A-side component. The elastomeric composition of the invention is prepared by admixing 2000 molecular weight PTMO with sufficient MDI isocyanate to product a prepolymer having 6.0 weight percent NCO. Once the A-side component is prepared, 204.4 grams thereof are charged into the A component tank. The B-side component is prepared by admixing 45.3 grams of the chain extender Unilink 4200, which is 4,4'-bis(secbutylamino)diphenylmethane with 0.2 grams of the Coscat catalyst. No antioxidant is utilized in this example. 45.5 grams of the total B-side component are then charged into the B component working tank. The A and B side components are then injected rapidly through a RIM mixhead into a production-type power transmission belt mold, and the resultant product has an A to B ratio of about 4.5. This particular composition is slow reacting and produces a product having lower modulus and lower high temperature and low temperature resistance capability.

EXAMPLE XI

In this particular example, the A-side component is prepared as in the prior Example X having a 6.0 weight percent NCO in the prepolymer. In this instance, 196.5 grams of the prepolymer are charged into the A-side component tank. The B component is then prepared by admixing 53.2 grams of the chain extender LONZACURE, which is a trade name for 4,4'-bis(2,5-diethyl-3-chloro-1-amino) diphenylmethane with 0.2 grams of the catalyst Coscat 83. Again, there is no antioxidant utilized in this particular example. The A and B side components are then injected through a RIM mixhead into a belt mold, and the resultant product has an A to B ratio of 3.7. This elastomeric composition has a modulus slightly higher than that of Example X with a similar tensile strength. The low temperature resistance is about the same as that of Example X while the high temperature resistance as well as its resiliency are better.

EXAMPLE XII

In this example, the A-side component is again prepared in the same manner as in the prior Examples X and XI. The B-side component is prepared by admixing 28.1 grams of the chain extender DETDA with 0.7 grams of the antioxidant Irganox 245. In this particular example, no catalyst is included. The A and B side components are then injected into a belt mold through a RIM mixhead. The resultant product has an A to B ratio of about 7.7. This particular composition is fast reacting and has a high tensile strength with good high temperature resistance and resiliency.

EXAMPLE XIII

In this example, the A-side component is again made as in the prior Examples X-XII. As in those prior examples, all of the polyol is placed in the A-side component. The B-side component is prepared by admixing 51.8 grams of the chain extender 4,4'-bis(3,5-diisoprophyl-1-amino)diphenylmethane (TIMDA) with 0.2 grams of the catalyst Coscat 83. In this example, no antioxidant is included in the B-side component. The A and B side components are then injected into a belt mold through a RIM mixhead, and the resultant product has an A to B ratio of 3.8. The composition of this Example has a lower hardness as compared to that of Example XII with a comparable high temperature resistance and a high tensile strength.

EXAMPLE XIV

In this example and in Example XV below, the composition was a pure urethane composition rather than a polyurea-urethane composition as in the prior examples. This is due to the choice of chain extender for the B-side component. In this example, the A-side component was formulated by admixing 12 weight percent 6000 MW PPO with MDI to prepare a prepolymer having 12.0 weight percent NCO. In this instance, 792.6 grams of prepolymer were charged to the A-side component tank. The B-side component tank was charged with 100.0 grams of the chain extender 1,4-butylene glycol (or butane diol) known as BDO without any other additives. The A and B side components were then injected through a RIM mixhead into a mold, and the resultant product had an A to B ratio of 7.9. The resultant composition formed a belt that had excellent low temperature resistance and elongation properties. However, high temperature resistance properties were sacrificed using this pure urethane system.

EXAMPLE XV

In this example, the A-side component was formulated as in Example XIV above, and 1150.8 grams were added to the A-component tank. However, the B-side component tank was charged with 100.0 grams of ethylene glycol as a chain extender without any other additives. The A and B side components were then injected through a RIM mixhead into a power transmission belt mold, cured, and then cut into belts. The resultant belt composition had an A to B ratio of 11.5. Again, this urethane belt sacrificed high temperature resistance capability in favor of enhanced low temperature resistance and reduced hardness as in Example XIV.

As can be seen from above, the present invention provides an improved elastomeric composition. This composition is preferably manufactured utilizing reaction injection molding technologies so as to provide for short mold times and rapid cure rates thereby substantially increasing the production capacity. However, casting and injection molding techniques may also be utilized. Moreover, the elastomeric composition of the present invention has particularly enhanced characteristics so as to retain its shape and strength under continuous dynamic loading conditions, particularly in belt applications, as well as resisting degradation and stretching under both high and low temperature conditions, particularly while under load. See the related application directed to belts constructed from the present invention. Thus, the elastomeric composition of the present invention is particularly useful as an improved and new composition for use in synchronous timing and power transmission belts for automobile engines subjected to unusually high temperatures of today's automobiles as well as V-belts, micro ribbed belts, industrial belts, molded boots and various other molded and elastomeric products.

The foregoing description and the illustrative embodiments of the present invention have been described in detail in varying modifications and alternate embodiments. It should be understood, however, that the foregoing description of the invention is exemplary only, and that the scope of the invention is limited only to the claims as interpreted in view of the prior art.

What is claimed is:

1. A molded elastomer having high and low temperature resistance in dynamic applications comprising the reaction product of an amine or hydroxy terminated polyol having an unsaturated level of less than about 0.06 milliequivalents per gram polyol, an hydroxyl or amine terminated chain extender, and a polyisocyanate-containing prepolymer capable of rapid reaction times with said extender when admixed together in a mold.

2. The elastomer as claimed in claim 1, wherein said prepolymer comprises an isocyanate content of about 3–25 weight percent —NCO.

3. The elastomer as claimed in claim 2, wherein said prepolymer includes an isocyanate content of about 6–15 weight percent —NCO.

4. The elastomer as claimed in claim 3, wherein said prepolymer includes an isocyanate content of about 7–12 weight percent —NCO.

5. The elastomer as claimed in claim 1, wherein said prepolymer comprises a polyether polyol and an aromatic or aliphatic polyisocyanate.

6. The elastomer as claimed in claim 1, wherein said prepolymer comprises an aromatic polyisocyanate having two or more —NCO groups per molecule.

7. The elastomer as claimed in claim 6, wherein said aromatic polyisocyanate is selected from the group consisting of 2,4-toluene diisocyanate, 2,6-toluene diisocyanate, 1,4-phenylene diisocyanate, 4,4'-diphenyl methane diisocyanate, 1,4-cyclohexane diisocyanate, trimethylxylylene diisocyanate, and the mixtures thereof, and wherein said extender is capable of rapid reaction time when admixed with a selected polyisocyanate.

8. The elastomer as claimed in claim 7, wherein said aromatic polyisocyanate comprises 4,4'-diphenyl methane diisocyanate.

9. The elastomer as claimed in claim 7, wherein said aromatic polyisocyanate comprises toluene diisocyanate.

10. The elastomer as claimed in claim 1, wherein said polyol comprises a polyether polyol having an average hydroxyl functionality of from about 2 to 8 and an average hydroxyl equivalent weight of from about 500 to 5000.

11. The elastomer as claimed in claim 10, wherein said polyether polyol has an average hydroxyl functionality of from about 2–4 and an average hydroxyl equivalent weight of approximately 1000–3000.

12. The elastomer as claimed in claim 11, wherein said polyether polyol has an average hydroxyl functionality of about 2–3 and an average hydroxyl equivalent weight of approximately 1500–2500.

13. The elastomer as claimed in claim 1, wherein said polyol comprises an alkylene oxide.

14. The elastomer as claimed in claim 13, wherein said alkylene oxide is selected from the group consisting of propylene oxide, ethylene oxide, and tetramethylene oxide.

15. The elastomer as claimed in claim 14, wherein said alkylene oxide comprises a block copolymer polypropylene oxide capped by ethylene oxide.

16. The elastomer as claimed in claim 14, wherein said polyol comprises polypropylene oxide polyol having a molecular weight of approximately of 5500–6000.

17. The elastomer as claimed in claim 1, wherein said reaction product has a —NCO/—OH ratio of approximately 0.90–1.20.

18. The elastomer as claimed in claim 17, wherein said ratio comprises approximately 1.01–1.03.

19. The elastomer as claimed in claim 1, wherein said chain extender comprises a compound capable of rapid reaction times with said prepolymer when admixed therewith in a mold, said compound being selected from the group consisting of aliphatic hydroxy compounds, aliphatic amines, aromatic amines and mixtures thereof.

20. The elastomer as claimed in claim 19, wherein said chain extender comprises an aliphatic hydroxy compound of low molecular weight oligomers.

21. The elastomer as claimed in claim 19, wherein said chain extender comprises an aliphatic amine selected from the group consisting of ethylene diamine, 1,3-diaminopropane, 1,4-diaminobutane, hexamethylenediamine, aminoethanolamine, 1,4-diaminocyclohexane, and triethylenetetramine.

22. The elastomer as claimed in claim 19, wherein said chain extender comprises an aromatic amine selected from the group consisting of 2,4-diaminotoluene, 2,6-diaminotoluene, 1,5-napthalenediamine, 1,4-phenylenediamine, 4,4'-methylene bis(orthochloroaniline), 1,4-butane diol 4,4'-methylenebisdianiline, 3,5-diethyl-2,4-diaminotoluene, diethyl toluene diamine, bis(3,5-diisopropyl-1-amino)diphenylmethane, and 4,4'-methylenebisaniline.

23. The elastomer as claimed in claim 22, wherein said chain extender comprises MOCA present in the amount of approximately 20-40 weight percent relative to the combined amount of chain extender and polyol.

24. The elastomer as claimed in claim 23, wherein said MOCA is present in approximately 35-40 percent by weight relative to the combined amount of chain extender and polyol.

25. The elastomer as claimed in claim 1, wherein polyol comprises approximately 5500-6000 molecular weight polyol, said chain extender comprises MOCA present in approximately 35-40 weight percent relative to the combination of MOCA and polyol, and wherein said prepolymer comprises MDI.

26. The elastomer as claimed in claim 1, wherein said reaction product further includes an effective amount of catalyst.

27. The elastomer as claimed in claim 26, wherein said catalyst is selected from the group consisting of organo-metal compounds, tertiary amines, and alkaline metal alkoxides.

28. The elastomer as claimed in claim 1, wherein said reaction product further includes an effective amount of antioxidant.

29. The elastomer as claimed in claim 1, wherein said polyol unsaturated level is less than about 0.03 milliequivalents/gram polyol.

30. The elastomer as claimed in claim 1, wherein said polyol has a polydispersity of less than about 1.05.

31. The elastomer as claimed in claim 29, wherein said polyol polydispersity is about 1.035 or less.

32. The elastomer as claimed in claim 1, wherein said elastomer further comprises a slip agent in the form of a lubricant.

33. The elastomer as claimed in claim 32, wherein said slip agent comprises a polysiloxane having an effective viscosity to provide a rate of migration through the elastomer to continuously replenish the surface of said elastomer with polysiloxane.

34. A segmented polyurethane and/or polyurea elastomer having a soft segment and a hard segment and made by reaction injection into a closed mold of a first composition comprising a polyisocyanate-containing prepolymer, and a second composition comprising a high equivalent weight isocyanate-reactive polyol having an unsaturated level of less than abut 0.06 milliequivalents per gram polyol and an hydroxyl- or amine-terminated chain extender to produce an elastomer having high temperature resistance in dynamic loading applications and having a hard-segment containing said polyol.

35. The elastomer as claimed in claim 34, wherein said polyol comprises an amine-terminated polyol.

36. The elastomer as claimed in claim 35, wherein said polyol includes ethyl or methyl side groups for inhibiting stress crystallization and glass formation at low temperature.

37. The elastomer as claimed in claim 35, wherein said polyol comprises a polyether polyol having an average hydroxyl functionality from about 2-8, an average hydroxyl equivalent weight from about 500 to 5000, and a molecular weight of up to 10,000.

38. The elastomer as claimed in claim 37, wherein said polyether polyol has an average hydroxyl functionality of from about 2 to 3, an average hydroxyl equivalent weight of approximately 1500 to 2500, and a molecular weight of approximately 5500 to 6000.

39. The elastomer as claimed in claim 30, wherein said polyether polyol comprises polypropylene oxide capped with ethylene glycol.

40. The elastomer as claimed in claim 34, wherein said polyisocyanate-containing prepolymer comprises diphenylmethane diisocyanate or derivatives thereof.

41. The elastomer as claimed in claim 40, wherein said prepolymer comprises MDI.

42. The elastomer as claimed in claim 34, wherein said chain extender comprises a compound selected from the group consisting of aliphatic hydroxy compounds, aliphatic amines, aromatic amines, and mixtures thereof.

43. The elastomer as claimed in claim 42, wherein said chain extender compound comprises an aromatic diamine.

44. The elastomer as claimed in claim 43, wherein said aromatic diamine chain extender comprises 20-100 weight percent of said second composition.

45. The elastomer as claimed in claim 44, wherein said aromatic diamine chain extender comprises approximately 35-40 weight percent of said second composition.

46. The elastomer as claimed in claim 43, wherein said aromatic diamine chain extender comprises MOCA.

47. In a reaction injection molded elastomer having a hard segment and a soft segment and formed by reacting an A-side component comprising a polyisocyanate with a B-side component comprising an isocyanate-reactive polyol and a chain extender, the improvement for enhancing the high and low temperature rigidity characteristics of said elastomer under dynamic loading conditions wherein said polyol has an unsaturated level of less than about 0.06 milliequivalents per gram polyol, wherein said A-side component comprises a prepolymer of said polyisocyanate and a polyether polyol, and wherein said B-side component comprises an isocyanate-reactive polyol with said chain extender being selected from the group consisting of aliphatic hydroxy compounds, alaphatic amines, aromatic amines, and mixtures thereof.

48. The improvement of claim 47, wherein said polyisocyanate comprises diphenylmethane diisocyanate or derivatives thereof.

49. The improvement of claim 48, wherein said polyisocyanate comprises MDI.

50. The improvement of claim 47, wherein said polyol has a molecular weight of up to 10,000.

51. The improvement of claim 50, wherein said polyol has a molecular weight of approximately 5500-6000.

52. The improvement of claim 47, wherein said polyol comprises a polyether polyol having methyl side groups for reducing glass formation of said elastomer.

53. The improvement of claim 47, wherein said polyol comprises polypropylene oxide.

54. The improvement of claim 47, wherein said chain extender comprises 20-100 weight percent of said B-side component.

55. The improvement of claim 54, wherein said chain extender comprises approximately 35-40 weight percent of B-side component.

56. The improvement of claim 54, wherein said chain extender comprises said B-side component, and wherein all of said polyol is in said prepolymer.

57. The improvement of claim 47, wherein said chain extender comprises an aromatic amine.

58. The improvement of claim 57, wherein said chain extender comprises MOCA.

59. The improvement of claim 47, wherein said elastomer has an —NCO/—OH ratio of approximately 0.90-1.20.

60. The improvement of claim 59, wherein said —NCO/—OH ratio comprises approximately 1.01-1.03.

61. A molded elastomer having high and low temperature resistance in dynamic applications comprising the reaction product of a polyisocyanate-containing prepolymer, an polyol having an unsaturated level of less than about 0.06 milliequivalents per gram polyol, and an hydroxyl or amine terminated chain extender capable of rapid reaction rates with said prepolymer when admixed therewith in a mold.

62. The elastomer of claim 61, wherein said polyol unsaturated level is less than about 0.03 milliequivalents per gram polyol.

63. A segmented polyurea-urethane elastomer having hard and soft segments and exhibiting high and low temperature resistance in dynamic applications, said elastomer comprising the reaction injection molding product of a polyisocyanate-containing prepolymer, an hydroxyl or amine terminated polyol having an unsaturated level of less than about 0.06 milliequivalents per gram polyol, and an amine terminated chain extender capable of rapid reaction times with said prepolymer.

64. The elastomer of claim 63, wherein said hard segments are formed from the reaction of said polyisocyanate and said chain extender.

65. The elastomer of claim 63, wherein said product is formed from the reaction injection molding of an A-side component comprising said prepolymer and a substantial portion of said polyol, and a B-side component comprising said chain extender and the residual portion of said polyol.

66. The elastomer of claim 65, wherein said A-side component comprises said prepolymer and all of said polyol.

67. The elastomer as claimed in claim 63, wherein said elastomer further comprises a slip agent in the form of a lubricant.

68. The elastomer as claimed in claim 67, wherein said slip agent comprises a polysiloxane.

* * * * *